US008830213B2

(12) United States Patent
Allen

(10) Patent No.: US 8,830,213 B2
(45) Date of Patent: Sep. 9, 2014

(54) METHODS AND APPARATUS FOR DRIVING MATRIX DISPLAY PANELS

(75) Inventor: Stephen Allen, Great Shelford (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 525 days.

(21) Appl. No.: 13/066,599

(22) Filed: Apr. 19, 2011

(65) Prior Publication Data

US 2012/0262469 A1 Oct. 18, 2012

(30) Foreign Application Priority Data

Apr. 13, 2011 (EP) .................................... 11368015

(51) Int. Cl.

| | |
|---|---|
| ***G06F 3/038*** | (2013.01) |
| ***G09G 5/00*** | (2006.01) |
| ***G09G 3/14*** | (2006.01) |
| ***G09G 3/20*** | (2006.01) |
| ***G09G 3/32*** | (2006.01) |

(52) U.S. Cl.

CPC ...... *G09G 3/3216* (2013.01); *G09G 2310/0208* (2013.01); *G09G 3/2081* (2013.01); *G09G 2360/16* (2013.01); *G09G 2330/021* (2013.01); *G09G 2310/021* (2013.01); *G09G 2310/0218* (2013.01); *G09G 2310/0205* (2013.01); *G09G 3/2018* (2013.01)

USPC ............................................ 345/204; 345/39

(58) Field of Classification Search

USPC ........................................ 345/39, 46, 55, 204

See application file for complete search history.

(56) References Cited

U.S. PATENT DOCUMENTS

| | | | | |
|---|---|---|---|---|
| 7,592,970 | B2 * | 9/2009 | Matthies et al. | 345/1.3 |
| 2009/0195563 | A1 | 8/2009 | Xu et al. | |
| 2009/0284511 | A1 | 11/2009 | Takasugi et al. | |
| 2010/0103203 | A1 | 4/2010 | Choi | |
| 2010/0207920 | A1 | 8/2010 | Chaji et al. | |
| 2010/0295760 | A1 | 11/2010 | Somerville | |
| 2010/0295845 | A1 | 11/2010 | Somerville et al. | |
| 2010/0295860 | A1 * | 11/2010 | Somerville et al. | 345/545 |
| 2010/0295861 | A1 | 11/2010 | Somerville et al. | |

FOREIGN PATENT DOCUMENTS

| | | |
|---|---|---|
| EP | 0 762 375 | 3/1997 |

OTHER PUBLICATIONS

European Search Report—App. No. 11368015.1-2205, Dialog Semiconductor GmbH.

* cited by examiner

*Primary Examiner* — Jacinta M Crawford

(74) *Attorney, Agent, or Firm* — Saile Ackerman LLC; Stephen B. Ackerman

(57) ABSTRACT

Systems and methods for realizing display drivers, especially OLED drivers having a high efficiency. With a single pass, using an algorithm based on simple equations based on gathered maximum display data, the driver can split an image to be displayed into multiple planes and tiles thus balancing peak current consumption. Furthermore the driver is able to optimize drive time periods in regard of many parameters.

26 Claims, 6 Drawing Sheets

FIG. 1 – Prior Art

FIG. 2 – Prior Art

| Timeslot | Row selection | Drive Calue Matrix |
|---|---|---|
| T1 | M(R1,R2) | M2 |
| T2 | S(R1) | S1 |
| T3 | M(R2,R3) | M2b |
| T4 | S(R2) | S1 |
| T5 | M(R3,R4) | M2 |
| T6 | S(R3) | S1 |
| T7 | M(R4,R5) | M2b |
| T8 | S(R4) | S1 |
| T9 | M(R5,R6) | M2 |
| T10 | S(R5) | S1 |
| T11 | M(R6,R7) | M2b |
| T12 | S(R6) | S1 |
| T13 | M(R7,R8) | M2 |
| T14 | S(R7) | S1 |
| T15 | M(R1,R2,R3,R4,R5,R6,R7,R8) | M8 |
| T16 | S(R8) | S1 |

METHODS AND APPARATUS FOR DRIVING MATRIX DISPLAY PANELS

This application is related to the following US patent applications:

titled "Back-to-Back precharge", Ser. No. 12/454,609, filing date May 20, 2009, titled "Advanced Multi-Line Addressing", Ser. No. 12/454,625, filing date May 20, 2009, titled "Extended Multi-Line Addressing", Ser. No. 12/455,554, filing date Jun. 3, 2009, and titled "Tagged Multi-Line Addressing, Ser. No. 12/455,527, filing date Jun. 3, 2009, and the above applications are herein incorporated by reference in their entirety.

BACKGROUND OF THE INVENTION (1) Field of the Invention

This invention relates generally to electronic display devices and relates more specifically to methods and apparatus for driving electronic matrix display panels.

(2) Description of the Prior Art

Many electronic devices, such as mobile telephones and other portable devices, make use of display panels for displaying information to a user of the device. A schematic diagram of such an electronic device is shown in FIG. 1 prior art of the accompanying drawings. The device 1 comprises a central processing unit (CPU) 10, which receives user and other inputs from an input device 12. The input device 12 may provide a keypad, a pointing device, a microphone, a wireless interface equipment or any other appropriate input apparatus. The CPU 10 operates to store data in a memory device 14, and in a data storage device 16 for non-volatile data storage. The CPU 10 supplies image data to a display device 18 for display to a user. Since embodiments of the present invention are concerned with methods and apparatus associated with the display device, the exemplary structure of an electronic device shown in FIG. 1 prior art should not be considered restrictive or limiting in any way. Other configurations of electronic device may make use of display devices.

The display device 18 includes a display panel 182, which is operable to display an image, and a driver 184, which controls the display panel 182, as will be described in more detail below. There are several types of display panel currently available. However, the display panel of special interest in the present case is a panel provided by a matrix of light emitting devices, such as an electro luminescent panel provided by a passive matrix organic light emitting diode (PM OLED) device. For the sake of clarity, the background and principles of the present invention will be described with reference to a PM OLED display panel, but it will be readily appreciated that the principles are more generally applicable to matrix display panels.

FIG. 2 prior art of the accompanying drawings illustrates schematically a display device 20. The display device 20 comprises a PM OLED display panel 22, and a display driver 24. The display panel 22 comprises a matrix of organic light emitting diodes (OLEDs) 222. By way of background explanation, an OLED is typically made up of two layers of organic material, one of which is a layer of light emitting material such as a light emitting polymer (LEP), oligomer, or a light emitting low molecular weight material, and the other of which is a layer of a hole transporting material such as a polythiophene derivative or a polyaniline derivative. The organic material is deposited onto a substrate material, such as glass, to provide a matrix of light emitting pixels. For a single color display device, a single OLED of the desired color is used per pixel, whereas in a multi color display device three OLEDs per pixel are provided to give red, green and blue output light respectively. The example shown in FIG. 2 prior art is a single color display for the sake of clarity, but it will be readily appreciated that the description below can be applied to a multi color device having red, green and blue OLEDs for each pixel.

The matrix of OLEDs 222 of FIG. 2 prior art, can have any appropriate number of columns and rows of OLEDs 222, but has been shown with four of each. Columns 0, 1, 2 . . . x, and cross rows 0, 1, 2 . . . y to create the matrix. In the following description of operation of the panel, an individual OLED is described as OLED 222-*ab*, where "a" is a column identifier, and "b" is a row identifier. Each column of the matrix is provided with a column electrode 224 (for example 224-0 for column 0, and 224-*x* for column x), to which one electrode of each of the OLEDs 222 in that column is connected. Similarly, each row of the matrix is provided with a row electrode 226 (for example 226-1 for row 1, and 226-*y* for row y), to which a second electrode of each OLED in the row is connected. In the example of FIG. 2 prior art, the anode of each OLED is connected to the appropriate column electrode 224, and the cathode of each OLED is connected to the appropriate row electrode 226. It will be readily appreciated that the OLED electrodes may be connected in an opposite configuration.

In a passive matrix (PM) OLED display panel, the OLEDs are repeatedly driven to give the impression of a steady image being displayed. The driving of an OLED is achieved by the supply of electrical current to the OLED. The current magnitude and length of time of the current supply together determine the brightness of the output light produced by the OLED. It is therefore necessary to provide driving control circuitry to generate the correct current/time values. The display device 20 of FIG. 2 prior art includes a column driver 242 and a row driver 244. In order to drive the OLEDs in the matrix to provide an output image, a voltage is applied across the row and column electrodes by the column driver 242 and the row driver 244, so that drive current is supplied to the OLEDs, and the OLEDs output light. In one previous technique for driving OLEDs, the column driver 242 includes a plurality of constant current supplies, and the row drivers operate to connect the row electrodes in turn to ground, thereby allowing current to flow through selected rows of OLEDs. The column driver 242 can operate to switch the current supplied selectively, so that an individual pixel can be driven by a correct selection of the column and row values. It is known to vary the brightness of the output light of an OLED by varying the time that the current is allowed to flow, and by varying the size of that current. The most usual known technique is to apply a constant current for a variable time, using a so-called "pulse width modulation" (PWM) technique.

Existing known techniques for driving matrix display devices are either simple, but inefficient, or are undesirably complex in the pursuit of efficiency. It is, therefore, desirable to provide a technique for driving a matrix display device that is relatively straightforward, and that provides good efficiency. Specifically, it desirable to provide a technique that can reduce the overall magnitude of power needed to display an image and that can balance peak current and drive time period considerations.

There are known patents or patent publications dealing with drivers for OLED displays.

U.S. Patent Publication (US 2010/0207920 to Chaji et al.) discloses a display system, a driver for driving the display array, method of operating the display system, and a pixel circuit in the display system. The driver includes: a bidirectional current source having a convertor coupling to a time-variant voltage for converting the time-variant voltage to the current. The pixel circuit includes: a transistor for providing a pixel current to a light emitting device; and a storage capacitor electrically coupling to the transistor, the capacitor coupling to a time-variant voltage in a predetermined timing for providing a current based on the time-variant voltage. The pixel circuit includes: an organic light emitting diode (OLED) device having an electrode and an OLED layer; and an inter-digitated capacitor, used for the driving capacitor, having a plurality of layers.

U.S. Patent Publication (US 2010/0103203 to Choi) proposes an organic light emitting display capable of minimizing power consumption. The organic light emitting display includes a plurality of pixels positioned at intersections of data lines and scan lines, the pixels including driving transistors positioned in an effective display region to control an amount of current that flows from a first power source to a second power source, a data driver for supplying data signals to the data lines, a scan driver supplying scan signals to the scan lines, a first power source generator generating the first power source, a second power source generator generating the second power source, and a voltage controller controlling the second power source generator so that voltage of the second power source is changed in response to a first voltage applied to an organic light emitting diode (OLED) included in a specific pixel when a data signal corresponding to specific brightness is supplied from the data driver to the specific pixel.

U.S. Patent Publication (US 2009/0284511 to Tagasuki) discloses an image display wherein luminance change due to change of the light-emitting device over time is compensated while suppressing affects of characteristics change in the drive transistor. Specifically disclosed is an image display comprising a plurality of pixels, wherein each pixel has a light-emitting device (OLED) which emits light when current is passed there through, a driver device for controlling light emission of the light-emitting device, and a control circuit, which is electrically connected to the light-emitting device and the driver device, and directly or indirectly detects the voltage applied to the light-emitting device at least during when the light-emitting device is emitting light and reflects the detection results to the driver device.

SUMMARY

A principal object of the present invention is to reduce power consumption of display driver devices as such as OLEDs.

A further object of the invention is to achieve display drivers having a high efficiency.

A further object of the present invention is to simplify the design of display drivers.

A further object of the present invention is to balance peak current consumption of display drivers.

A further object of the present invention is to optimize drive time periods.

Moreover an object of the present invention is to have a focus to optimize organic light emitting diode (OLED) display devices.

In accordance with the objects of this invention a method to achieve an efficient display driver using a simple computation with a minimal number of computation passes has been disclosed. The method invented comprises the following steps: (1) providing a display device, comprising row and column drivers and power supply, a processor, an input device, a memory device and a data storage device, (2) loading pixel values of an image matrix, having rows and columns, to be displayed into the data storage, (3) computing in a single pass pixel values to support splitting the image into different planes, and (4) displaying sequentially the different planes of the image.

In accordance with the objects of this invention an apparatus for driving a matrix display panel in which a plurality of pixels are arranged in a matrix having respective pluralities of rows and columns has been disclosed. The apparatus invented comprises, firstly: an image data buffer operable to retrieve image data relating to respective image drive values for a predetermined number of pixels, the predetermined number of pixels being arranged as a matrix having a first plurality of rows, and a second plurality of columns, and a calculation unit operable to: (i) calculate and store respective common row drive values for pixels in a given column, a common row drive value being equal to a lowest drive value for pixels in the column concerned, (ii) calculate respective residual drive values for each pixel, a residual drive value for a pixel being equal to an image drive value for that pixel minus a common row value for the column in which the pixel is located, and (III) to store residual drive values as the image data for the first plurality of rows. Furthermore the apparatus comprises a drive data buffer operable to store drive values, and drive circuitry operable to receive drive values from the drive data buffer, and to drive a matrix display panel in dependence upon received drive values, wherein the calculation unit is operable to repeat such calculation and storage operations for a predefined number of iterations.

BRIEF DESCRIPTION OF THE DRAWINGS

In the accompanying drawings forming a material part of this description, there is shown.

DESCRIPTION OF THE PREFERRED EMBODIMENTS

The preferred embodiments of the invention describe apparatus and methods for driving passive matrix organic light emitting diodes (PM OLEDs) by supplying electrical currents to an OLED display matrix. Precharging and multi-Line Addressing as e.g. disclosed in patent applications titled "Back-to-Back precharge", Ser. No. 12/454,609, filing date May 20, 2009, titled "Advanced Multi-Line Addressing", Ser. No. 12/454,625, filing date May 20, 2009, titled "Extended Multi-Line Addressing", Ser. No. 12/455,554, filing date Jun. 3, 2009, and titled "Tagged Multi-Line Addressing, Ser. No. 12/455,527, filing date Jun. 3, 2009, which are all herein incorporated by reference in their entirety, may be used with the present invention.

It should be noted that the present invention can easily be used with other display types than OLEDs.

Figure 2:
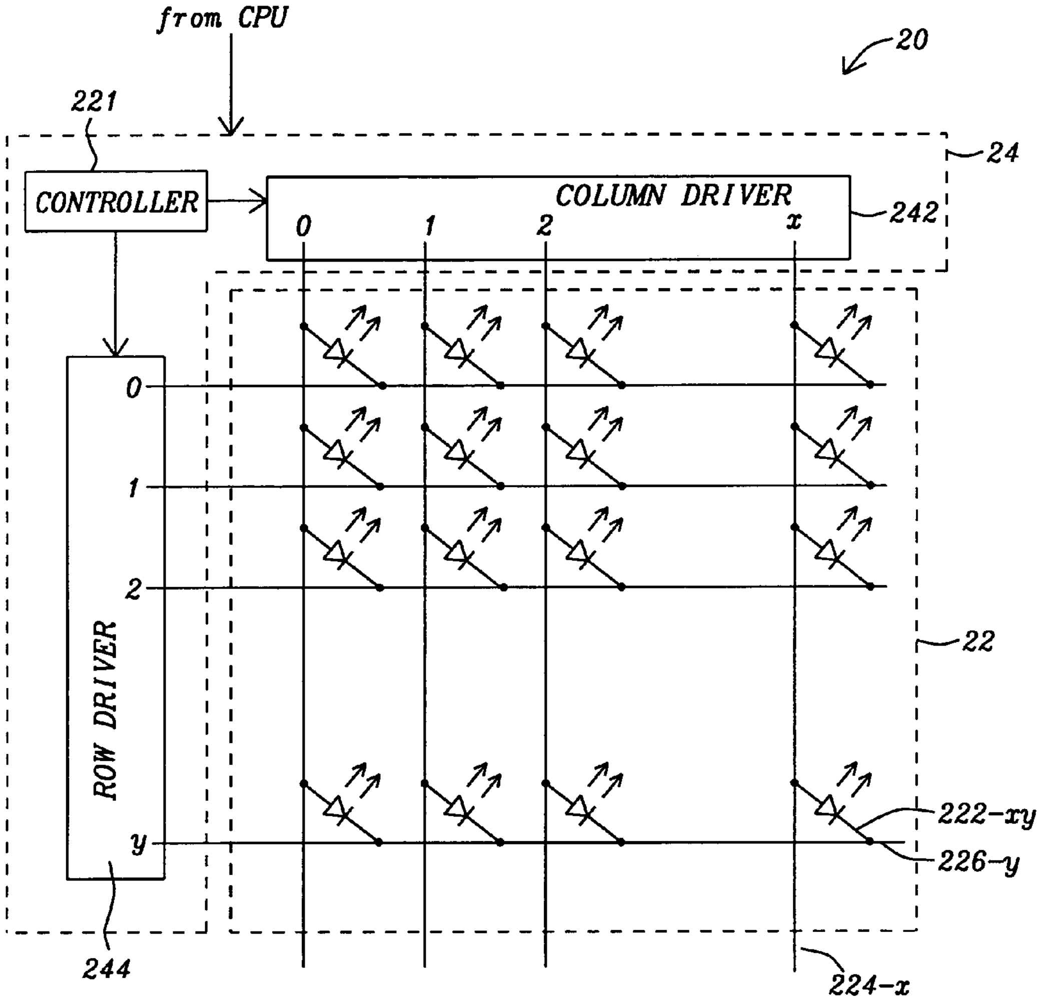
FIG. 2 prior art shows a schematic of the structure of an electronic display and the related column and row drivers.
Figure 3:
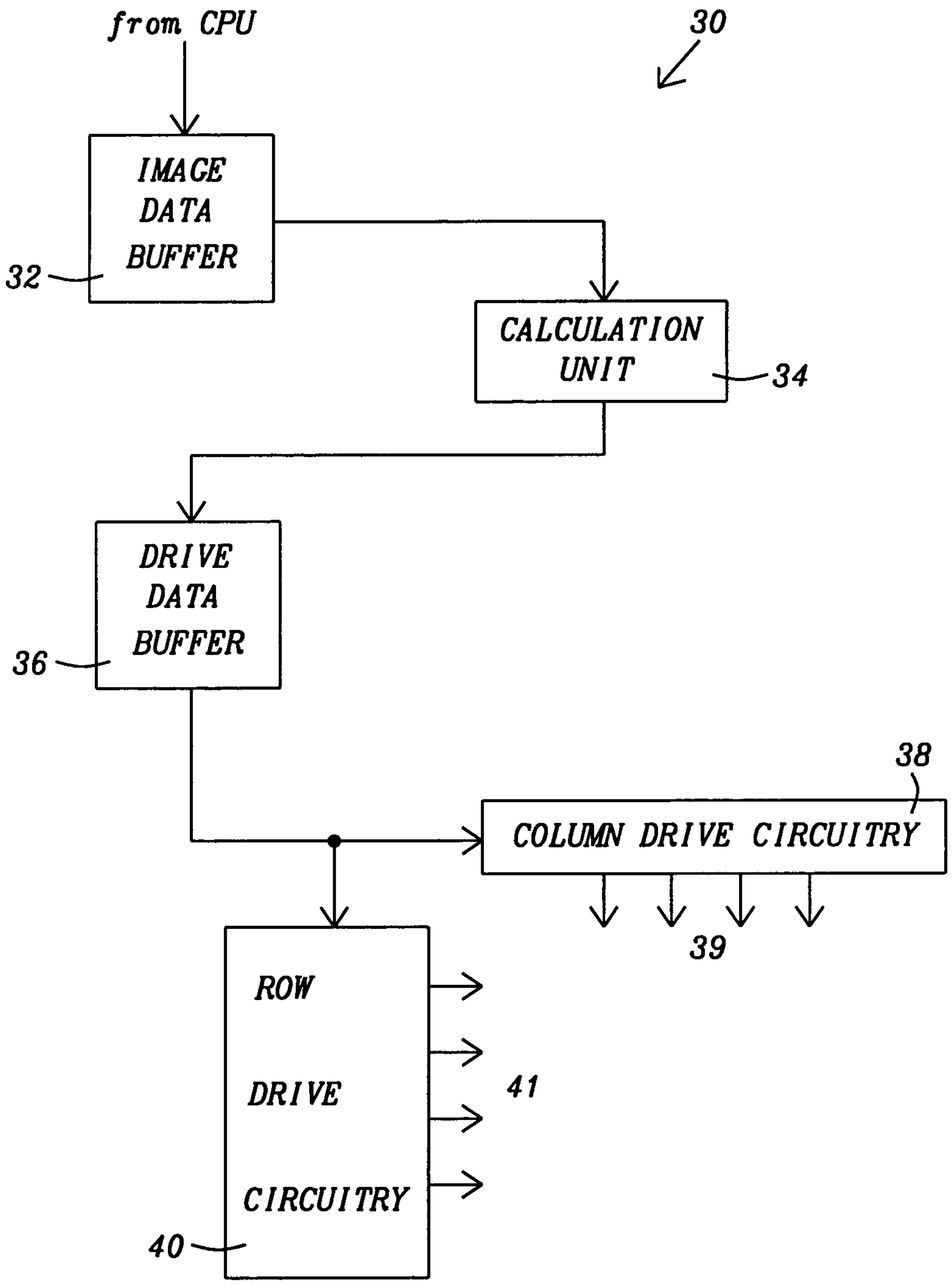
FIG. 3 illustrates a display driver embodying an aspect of the present invention.

As described above, FIGS. 1 and 2 prior art of the accompanying drawings illustrate schematically an electronic device 1 and a display device 20 respectively. FIG. 3 illustrates a matrix display driver 30 embodying one aspect of the present invention which is suitable for use in the devices of FIGS. 1 and 2 prior art.

Figure 1:
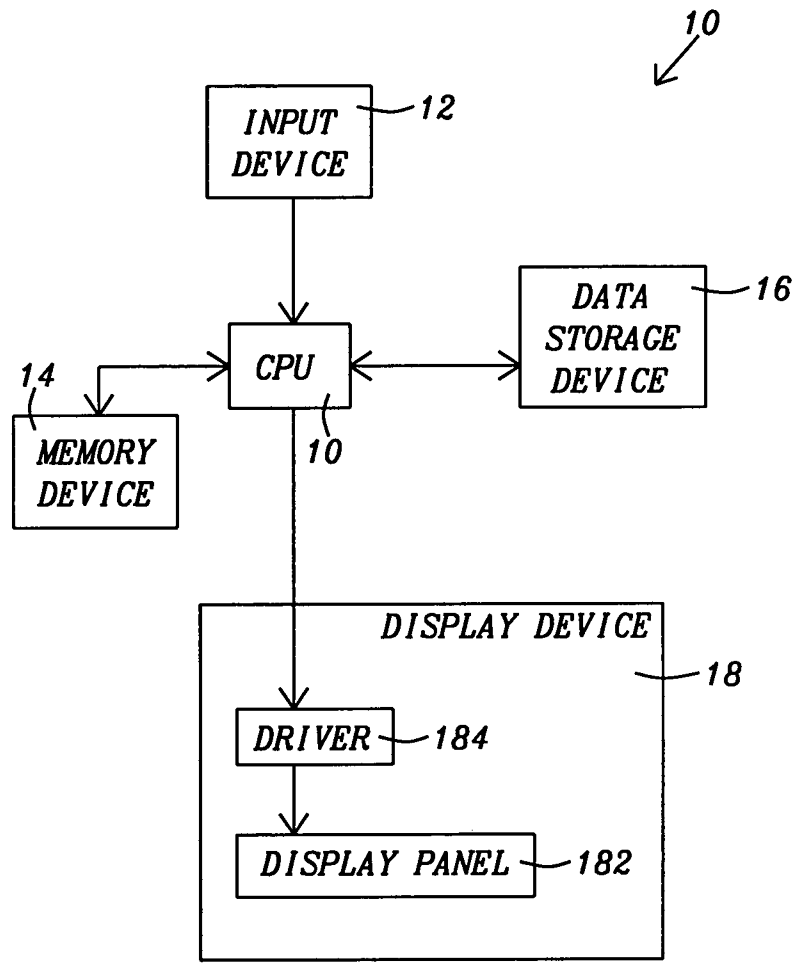
FIG. 1 prior art shows a schematic diagram of an electronic display device.

The driver 30 shown in FIG. 3 comprises an image data buffer 32 connected to receive image data from a host (for example the CPU 10 of FIG. 1 prior art). The image data buffer 32 stores this image data in order to allow the driver 30 to perform calculations to produce drive data for the display device 20 shown in FIG. 2.

A calculation unit 34 is connected to retrieve stored image data from the image data buffer, and operates to perform calculations thereon, as will be described in more detail below. Image data can be retrieved from the image data buffer 32 in portions of any appropriate size, suitable for the calculations to be described.

The calculation unit 34 operates to supply calculated drive data to a drive data buffer 36, which is configured to store drive data for supply to column and row drive circuitry 38 and 40. The column drive circuitry 38 retrieves drive data from the drive data buffer 36 and uses the data to generate column outputs 39 in dependence upon the data to drive the columns of the matrix. The row drive circuitry 40 generates row outputs 41 which serve to select the rows of the display 20 to be driven at any given time period.

Initially, the host, or CPU 10, stores a block of image data in the image data buffer 32. The image data block may represent a full display image frame, or a portion of that image frame. The image data values stored in the image data buffer represent the relative brightness of each of the pixels in the image. The image data values represent the current magnitude/time period combination, since it is these two parameters that determine the output brightness of an OLED. The values may be normalized. The values are referred to below as drive values. It will be appreciated that a drive value can be achieved by varying one or both of the current magnitude and time period of the current supply from the column driver circuitry to a given column.

The calculation unit 34 retrieves a predetermined part of the stored image data from the image data buffer 32. This predetermined part may be the whole of the stored data, or a selected portion of the image data. In the example described below, a 3-column (C1, C2, C3), 8-row portion (R1, R2, R3, R4, R5, R6, R7, R8) is retrieved by the calculation unit 34. The retrieved image data values are shown below in the matrix labeled "I".

The calculation unit 34 operates to perform an iterative calculation process on the image data retrieved from the image data buffer 32. The first iteration uses the image data as its input data, and the subsequent iterations use residual data from the previous iteration as inputs. Each iteration uses either a different number of rows or a different row offset to the previous iteration. The residue doesn't need to be stored for the next iteration it is re-calculated on subsequent iterations. In one example, the calculation process operates on (i) an 8-row stripe;

(ii) even row pairs; and (iii) odd row pairs.

There are no restrictions on the combinations of rows or offsets that can be used, but at some point the return on time or reduced peak current becomes zero. The example given below should not be seen a restrictive in its description of a particular choice of rows for calculations, but merely as an example chosen for the sake of clarity.

The method indicated above will now be described below. The example method will be described in detail using a 3 column by 8 row data I of an image, although it will be appreciated that these values have been chosen arbitrarily, and that other values could be chosen:

$$I = \begin{vmatrix} 4 & 7 & 3 \\ 0 & 7 & 13 \\ 2 & 0 & 14 \\ 2 & 3 & 12 \\ 7 & 15 & 15 \\ 8 & 10 & 3 \\ 2 & 1 & 5 \\ 14 & 10 & 11 \end{vmatrix}$$

and a related row limit, i.e. maximum values of each row, is $$\begin{vmatrix} 7 \\ 13 \\ 14 \\ 12 \\ 15 \\ 10 \\ 5 \\ 14 \end{vmatrix}.$$

A next step (S3) is to calculate "common values" CV of the matrix, i.e. the minimum values of each column of the matrix namely:

$$CV = \begin{vmatrix} 0 \\ 0 \\ 3 \end{vmatrix}.$$

A residue limit for the M84 matrix is calculated by the equation:

residue limit=max (image $I$−common values CV) or using the numbers of the example above:

$$\text{residue limit} = \max \begin{vmatrix} 4-0 & 7-0 & 3-3 \\ 0-0 & 7-0 & 13-3 \\ 2-0 & 0-0 & 14-3 \\ 2-0 & 3-0 & 12-3 \\ 7-0 & 15-0 & 15-3 \\ 8-0 & 10-0 & 3-3 \\ 2-0 & 1-0 & 5-3 \\ 14-0 & 10-0 & 11-3 \end{vmatrix} = \begin{vmatrix} 7 \\ 10 \\ 11 \\ 9 \\ 15 \\ 10 \\ 2 \\ 14 \end{vmatrix}$$

Hence the residue limits for each row are: row 1=7, row 2=10, row 3=11, row 4=9, row 5=15, row 6=10, row 7=2, row 8=14.

In the following step (S4) the residue limits calculated in step 3 are used to calculate a Mn-row limit. The Mn-row limit is calculated according the equation:

$Mn$-row limit=max(row limit−residue limit) using the values of each matrix row:

Using the numbers of the example above, the M8-row limit is calculated $M8$-row limit=max(7-7,13-10,14-11,12-9,15-15,10-10,5-2,14-14)=3.

The following step (S5) comprises extracting the common Mn-row values by subtracting the common values from the image values up to the Mn-row limit calculated in step (S4). The Mn-row limit calculated in step (S4) is key to split the image into common image and residue image. In reality the Mn-row limit is calculated as the image is copied from the raw-data into the data buffer and then the image is separated on-the-fly as it is outputted. For this calculation it is only required to store the Mn-row limit. The common matrix is calculated according the equation:

Common matrix=minimum (common, $Mn$-row limit)

Using the numbers of the example above the common matrix is calculated by comparing the common values CV "0, 0, 3" calculated in step (S3) with the M8 limit=3, calculated in step (S4), i.e.

$$\text{Common matrix } M8 = \min\begin{vmatrix} 0vs3 & 0vs3 & 3vs3 \\ 0vs3 & 0vs3 & 3vs3 \\ 0vs3 & 0vs3 & 3vs3 \\ 0vs3 & 0vs3 & 3vs3 \\ 0vs3 & 0vs3 & 3vs3 \\ 0vs3 & 0vs3 & 3vs3 \\ 0vs3 & 0vs3 & 3vs3 \\ 0vs3 & 0vs3 & 3vs3 \end{vmatrix} = \begin{vmatrix} 0 & 0 & 3 \\ 0 & 0 & 3 \\ 0 & 0 & 3 \\ 0 & 0 & 3 \\ 0 & 0 & 3 \\ 0 & 0 & 3 \\ 0 & 0 & 3 \\ 0 & 0 & 3 \end{vmatrix}.$$

It should be noted that the common matrix corresponds to the lowest drive values for pixels in the column concerned.

In the following step (S6) the residue matrix is calculated using the equation residue matrix=image values−common matrix. The common matrix has been calculated in step (S5). Using the numbers of our example a residue matrix S1 is calculated $$S1 = \begin{vmatrix} 4-0 & 7-0 & 3-3 \\ 0-0 & 7-0 & 13-3 \\ 2-0 & 0-0 & 14-3 \\ 2-0 & 3-0 & 12-3 \\ 7-0 & 15-0 & 15-3 \\ 8-0 & 10-0 & 3-3 \\ 2-0 & 1-0 & 5-3 \\ 14-0 & 10-0 & 11-3 \end{vmatrix} = \begin{vmatrix} 4 & 7 & 0 \\ 0 & 7 & 10 \\ 2 & 0 & 11 \\ 2 & 3 & 9 \\ 7 & 15 & 12 \\ 8 & 10 & 0 \\ 2 & 1 & 2 \\ 14 & 10 & 8 \end{vmatrix},$$

wherein now the row residue limits of S1 are calculated:
row 1 residue limit=max (4, 7, 0)=7
row 2 residue limit=max (0, 7, 10)=10
row 3 residue limit=max (2, 0, 11)=11
row 4 residue limit=max (2, 3, 9)=9
row 5 residue limit=max (7, 15, 12)=15
row 6 residue limit=max (8, 10, 0)=10
row 7 residue limit=max (2, 1, 2)=2
row 8 residue limit=max (14, 10, 8)=14

It should be understood that an addition of S1 matrix with the common M8 matrix yields the image I matrix.

As described above in the first iteration of the calculation of drive data, the calculation unit 34 calculates the common row drive value per column for a first selection of the retrieved rows, in this example for all eight of the rows in the retrieved image data I. In this example using eight rows, the common row drive value is referred to as the "8-row" drive value. The 8-row drive value is the lowest value that occurs in a given 8-row column. In the general case of N rows, the common N-row drive value for each column is the lowest value that occurs in that N-row column. In the example outlined above, the 8-row drive values are 0, 0, and 3 for columns C1, C2, and C3 respectively.

In the next iteration, the common row drive value and residual drive value calculations are performed on the residual drive value matrix resulting from the first iteration using a second selection of rows. In this example, "even" pairs of rows are chosen for the second iteration, i.e. pairs of row 1 and row 2, pairs of rows 3 and 4, pairs of rows 5 and 6, etc. "Odd" pairs of rows, used later, are pairs of rows 2 and 3, pairs of rows 4 and 5, pairs of rows 6 and 7, etc.

The previous residual drive values S1 are used to calculate common row drive values M2 for even pairs of rows. That is, respective common row drive values M2 are calculated for the even pairs of rows. For each pair of rows, new residual drive values S1* are calculated. In the example shown, for the even pairs of rows:

$$S1 = \begin{vmatrix} 4 & 7 & 0 \\ 0 & 7 & 10 \\ 2 & 0 & 11 \\ 2 & 3 & 9 \\ 7 & 15 & 12 \\ 8 & 10 & 0 \\ 2 & 1 & 2 \\ 14 & 10 & 8 \end{vmatrix}$$

and a related row limit, i.e. maximum values of each row, is $$\begin{vmatrix} 7 \\ 10 \\ 11 \\ 9 \\ 15 \\ 10 \\ 2 \\ 14 \end{vmatrix}.$$

The "common values" CV* of the four even pairs of rows R1+2, R3+4, etc, shown above, i.e. the minimum values of each column of the matrix within each pair of rows above is $$CV^* = \begin{vmatrix} 0 & 7 & 0 \\ 0 & 7 & 0 \\ 2 & 0 & 9 \\ 2 & 0 & 9 \\ 7 & 10 & 0 \\ 7 & 10 & 0 \\ 2 & 1 & 2 \\ 2 & 1 & 2 \end{vmatrix}$$

A residue limit for the M2 matrix is calculated by the equation:

residue limit=max($S1$−common values CV*) or using the numbers of the example above:

$$\text{residue limit} = \max \left| \begin{array}{ccc} 4-0 & 7-7 & 0-0 \\ 0-0 & 7-7 & 10-0 \\ 2-2 & 0-0 & 11-9 \\ 2-2 & 3-0 & 9-9 \\ 7-7 & 15-10 & 12-0 \\ 8-7 & 10-10 & 0-0 \\ 2-2 & 1-1 & 2-2 \\ 14-2 & 10-1 & 8-2 \end{array} \right| = \left| \begin{array}{c} 4 \\ 10 \\ 2 \\ 3 \\ 12 \\ 1 \\ 0 \\ 12 \end{array} \right|.$$

Now the M2-row limits for the four pairs of rows of the residue matrix S1 are calculated according to the equation:

*M2*-row limit=max(row limit−residue limit) using the values of each pair of matrix rows.

Using the numbers of the example above:

*M2* row-limits=max(7-4, 10-10), max(11-2, 9-3), max (15-12, 10-1), and max(2-0, 14-12)=for rows 1+2=3, for rows 3+4=9, for rows 5+6=9, and for rows 7+8=2.

Now the common matrix for the even pairs of rows is calculated like in the first iteration:

common matrix=min(common, *M2* row limit) comparing the CV*values with the *M2* row-limit:

Common matrix $M2$ for the even pairs of rows =

$$\min \left| \begin{array}{ccc} 0vs3 & 7vs3 & 0vs3 \\ 0vs3 & 7vs3 & 0vs3 \\ 2vs9 & 0vs9 & 9vs9 \\ 2vs9 & 0vs9 & 9vs9 \\ 7vs9 & 10vs9 & 0vs9 \\ 7vs9 & 10vs9 & 0vs9 \\ 2vs2 & 1vs2 & 2vs2 \\ 2vs2 & 1vs2 & 2vs2 \end{array} \right| = \left| \begin{array}{ccc} 0 & 3 & 0 \\ 0 & 3 & 0 \\ 2 & 0 & 9 \\ 2 & 0 & 9 \\ 7 & 9 & 0 \\ 7 & 9 & 0 \\ 2 & 1 & 2 \\ 2 & 1 & 2 \end{array} \right|$$

Now the residue matrix for the even pairs of rows is calculated using the equation residue matrix=image values−common matrix. The common matrix has been calculated in step (S5). Using the numbers of our example a residue matrix S1* is calculated $$S1^* = \left| \begin{array}{ccc} 4-0 & 7-3 & 0-0 \\ 0-0 & 7-3 & 10-0 \\ 2-2 & 0-0 & 11-9 \\ 2-2 & 3-0 & 9-9 \\ 7-7 & 15-9 & 12-0 \\ 8-7 & 10-9 & 0-0 \\ 2-2 & 1-1 & 2-2 \\ 14-2 & 10-1 & 8-2 \end{array} \right| = \left| \begin{array}{ccc} 4 & 4 & 0 \\ 0 & 4 & 10 \\ 0 & 0 & 2 \\ 0 & 3 & 0 \\ 0 & 6 & 12 \\ 1 & 1 & 0 \\ 0 & 0 & 0 \\ 12 & 9 & 6 \end{array} \right|$$

and a related row limit is $$\left| \begin{array}{c} 4 \\ 10 \\ 2 \\ 3 \\ 12 \\ 1 \\ 0 \\ 12 \end{array} \right|.$$

The previous residual drive values S1* are used now to calculate common row drive values M2*b* for the odd pairs of rows, i.e. rows R2-R3, R4-R5, R6-R7. Rows R and R8 remain unchanged. That is, respective common row drive values M2*b* are calculated for the odd pairs of rows. For each pair of rows, new residual drive values S1* are calculated. In the example shown, for the odd pairs of rows:

The "common values" CV* of the odd pairs of rows shown above, i.e. the minimum values of each column of the matrix S* within each odd pair of rows above is $$CV^* = \left| \begin{array}{ccc} 4 & 4 & 0 \\ 0 & 0 & 2 \\ 0 & 0 & 2 \\ 0 & 3 & 0 \\ 0 & 3 & 0 \\ 0 & 0 & 0 \\ 0 & 0 & 0 \\ 12 & 9 & 6 \end{array} \right|$$

A residue limit for the M2*b* matrix is calculated by the equation:

residue limit=max(*S*1−common values CV*) or using the numbers of the example above:

$$\text{residue limit} = \max \left| \begin{array}{ccc} 4vs4 & 4vs4 & 0vs0 \\ 0vs0 & 4vs0 & 10vs2 \\ 0vs0 & 0vs0 & 2vs2 \\ 0vs0 & 3vs3 & 0vs0 \\ 0vs0 & 6vs3 & 12vs0 \\ 1vs0 & 1vs0 & 0vs0 \\ 0vs0 & 0vs0 & 0vs0 \\ 12vs12 & 9vs9 & 6vs6 \end{array} \right| = \left| \begin{array}{c} 0 \\ 8 \\ 0 \\ 0 \\ 12 \\ 1 \\ 0 \\ 0 \end{array} \right|.$$

Now the M2*b*-row limits for the odd pairs of rows of the residue matrix S1* are calculated according to the equation:

*M2b*-row limit=max(row limit−residue limit) using the values of each pair of matrix rows.

Using the numbers of the example above:

*M2b* row-limits (rows 2-7)=max(10-8,2-0), max(3-0, 12-12), and max(1-1,0-0)=for rows 2-3=2, for rows 4-5=3, for rows 6-7=0.

Now the common matrix for the even pairs of rows is calculated like in the first iteration:

common matrix=min(common, *M2* row limit) comparing the CV* values with the *M2* row-limit:

Common matrix $M2B$ for the odd pairs of rows =

$$\min \left| \begin{array}{ccc} 0 & 0 & 0 \\ 0vs2 & 0vs2 & 2vs2 \\ 0vs2 & 0vs2 & 2vs2 \\ 0vs3 & 3vs3 & 0vs3 \\ 0vs3 & 3vs3 & 0vs3 \\ 0vs0 & 0vs0 & 0vs0 \\ 0vs0 & 0vs0 & 0vs0 \\ 0 & 0 & 0 \end{array} \right| = \left| \begin{array}{ccc} 0 & 0 & 0 \\ 0 & 0 & 2 \\ 0 & 0 & 2 \\ 0 & 3 & 0 \\ 0 & 3 & 0 \\ 0 & 0 & 0 \\ 0 & 0 & 0 \\ 0 & 0 & 0 \end{array} \right|$$

Now the residue matrix for the odd pairs of rows is calculated using the equation residue matrix=image values−common matrix. The common matrix M2B has been calculated above. Using the numbers of our example a residue matrix S1 is calculated $$S1^{} = \begin{vmatrix} 4-0 & 4-0 & 0-0 \\ 0-0 & 4-0 & 10-2 \\ 0-0 & 0-0 & 2-2 \\ 0-0 & 3-3 & 0-0 \\ 0-0 & 6-3 & 12-0 \\ 1-0 & 1-0 & 0-0 \\ 0-0 & 0-0 & 0-0 \\ 12-0 & 9-0 & 6-0 \end{vmatrix} = \begin{vmatrix} 4 & 4 & 0 \\ 0 & 4 & 8 \\ 0 & 0 & 0 \\ 0 & 0 & 0 \\ 0 & 3 & 12 \\ 1 & 1 & 0 \\ 0 & 0 & 0 \\ 12 & 9 & 6 \end{vmatrix},$$

Now the image to be displayed can be put together again according to the equation:

$I=S^{}+M2+M2B+M8$ or $$\begin{matrix} I & \text{Row max} & & S^{} \\ \begin{vmatrix} 4 & 7 & 3 \\ 0 & 7 & 13 \\ 2 & 0 & 14 \\ 2 & 3 & 12 \\ 7 & 15 & 15 \\ 8 & 10 & 3 \\ 2 & 1 & 5 \\ 14 & 10 & 11 \end{vmatrix} & \begin{matrix} 7 \\ 13 \\ 14 \\ 12 \\ 15 \\ 10 \\ 5 \\ 14 \end{matrix} & = & \begin{vmatrix} 4 & 4 & 0 \\ 0 & 4 & 8 \\ 0 & 0 & 0 \\ 0 & 0 & 0 \\ 0 & 3 & 12 \\ 1 & 1 & 0 \\ 0 & 0 & 0 \\ 12 & 9 & 6 \end{vmatrix} + \end{matrix}$$

$$\begin{matrix} M2 & & M2B & & M8 \\ \begin{vmatrix} 0 & 3 & 0 \\ 0 & 3 & 0 \\ 2 & 0 & 9 \\ 2 & 0 & 9 \\ 7 & 9 & 0 \\ 7 & 9 & 0 \\ 2 & 1 & 2 \\ 2 & 1 & 2 \end{vmatrix} & + & \begin{vmatrix} 0 & 0 & 0 \\ 0 & 0 & 2 \\ 0 & 0 & 2 \\ 0 & 3 & 0 \\ 0 & 3 & 0 \\ 0 & 0 & 0 \\ 0 & 0 & 0 \\ 0 & 0 & 0 \end{vmatrix} & + & \begin{vmatrix} 0 & 0 & 3 \\ 0 & 0 & 3 \\ 0 & 0 & 3 \\ 0 & 0 & 3 \\ 0 & 0 & 3 \\ 0 & 0 & 3 \\ 0 & 0 & 3 \\ 0 & 0 & 3 \end{vmatrix} \end{matrix}$$

The resulting drive values are shown above. The simple drive scheme of selecting each row separately and then driving the columns according to the drive values for the pixels in that row is shown in the "image" matrix I. The drive scheme embodying one aspect of the present invention is shown as the series of drive matrices mentioned above:

S1 is the matrix for the single row selection drive values, M2 is the matrix for the even row pair selection drive values, M2*b* is the matrix for the odd row pair selection drive values, and M8 is the common drive values for all 8 rows. It will be seen that sum of the four plane drive values for each individual pixel in the image portion equals the image data values in the Image matrix, and so the brightness of an individual pixel is as desired. However, the four planes (M8, M2, M2*b* and S1) drive scheme results in a lower overall count value for the drive values. This reduction in overall count results from the use of common drive periods, since multiple rows are selected in parallel during some of the timeslots.

Following the calculations, set out above, drive data can be written to the drive data buffer for use by the column drive circuitry. In the present example, the drive data is split into four planes of data—an eight row common drive matrix M8, an even row pair common drive matrix M2, an odd row pair common drive matrix M2*b*, and a single line drive matrix S1.

Figures 4, 5:
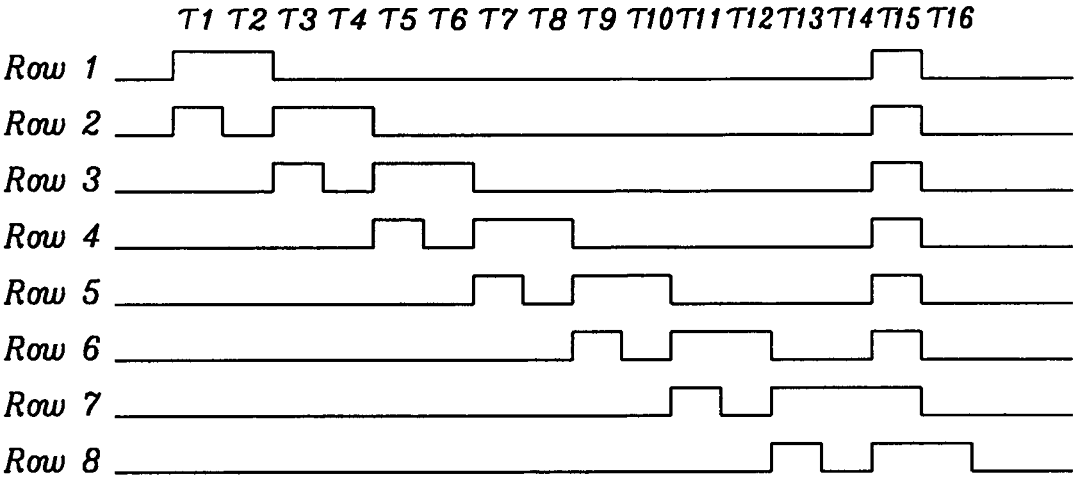
FIG. 4 illustrates row selection timing in a method embodying an aspect of the present invention.
FIG. 5 illustrates row selection for the method illustrated in the timing diagram of FIG. 4.

FIG. 4 is a timing diagram illustrating the timing of row selection outputs 41 from the row drive circuitry 40. The timing diagram is illustrative of the principles of embodiments of the present invention, and relates to the example described above. Driving the eight rows takes sixteen variable length timeslots (T1 to T16), and the common drive periods (M) alternate with single row drive periods (S), with the even row pair drive periods alternating with the odd row pair periods in the common drive period series. The timeslots are shown as being of a fixed period in FIG. 4 for the sake of clarity. The order of driving the rows can be altered from that as shown.

The rows driven in each of the time slots is shown in FIG. 5, where M represents a multiple or common drive in which a number of rows are selected in parallel, and S represents a single line selection in which a single row is selected. During each time slot the column drive values given in the drive value matrices are used to determine the current/time parameters for each column. The column drive circuitry 38 determines the length of each timeslot in dependence upon the period/current balance, to be described in more detail below, and supplies that timeslot information to the row driver circuitry.

The example driving scheme described above makes use of a stripe of eight rows, and an eight row drive timeslot, in combination with row pair timeslots and single row selection timeslots. It will be readily appreciated that the principles of a method embodying an aspect of the present invention can be applied to other numbers of rows, for example four rows. In addition, further matrices could be generated, for other multiple row selections. For example, in the case of the processing of eight rows of image data, five matrices could be used: eight row selection, four row selection, even row pair selection, odd row pair selection, and single row selection. The number of rows of image data retrieved from the image data buffer will determine the maximum number of planes that can be used. The calculations for each row selection matrix will, however, follow those as described above.

The calculation of the M8 matrix and the M2 matrix, with resulting residual values can be carried out in a single pass through the image data, and the output of that pass is stored directly in the drive data buffer. The odd row pair calculation requires an additional calculation step, and this requires a further pass through the drive data, with the results being stored in the drive data buffer. In some implementations, therefore, it may be desirable to reduce the amount of calculation time, and so the results of the M8 and M2 calculation can be used for the drive data for the display. The calculations could be performed in parallel to reduce computation time. The computation is based on the maximum values calculated across a range of rows and columns. The image can, therefore, be decomposed into a number of tiles of fixed width and height. Each tile can be processed in parallel and the maximum values combined to give the true limits for the residual and common planes.

As an alternative, the M2 matrix results can be used for an initial image display, and then image refresh periods can use the "full" results including the M2*b* matrix. Typically, each image frame is displayed once, and then refreshed a predetermined number of times, for example three or four times. The additional calculation for the odd row pairs is performed between the during the initial image display before the first refresh.

As mentioned above, the column drive circuitry 38 operates to determine the current magnitude/time period required to drive each column to the correct level, in dependence upon a number of parameters. For example, it may be necessary to reduce the time period for each column, in which case a higher current magnitude will be required. Alternatively, a fixed current source may be employed, and so the timeslot periods must then be adjusted in order to achieve the required drive level. Another alternative would be for the timeslots to be equal, in which case the current magnitude would then be adjusted for each column to achieve the required drive level. It might also be desirable to maximize the data in one of the planes (for example the M8) for power efficiency reasons and yet still minimize the time spent in the other planes where the benefit is not so great. The selection of the different alternatives might also be made dependent on the contents of the image and different approaches used for different types of images. It will be appreciated that the terms "column" and "row" are used for the sake of clarity, and do not imply an orientation for the display device. The terms column and row can be interchanged without limiting the validity of the techniques to be described. In addition, it will be readily appreciated that the direction of current flow between column and row electrodes is arbitrary, and could be opposite to that described, while being consistent with the need to forward bias the OLEDs to provide output light.

Figure 6:
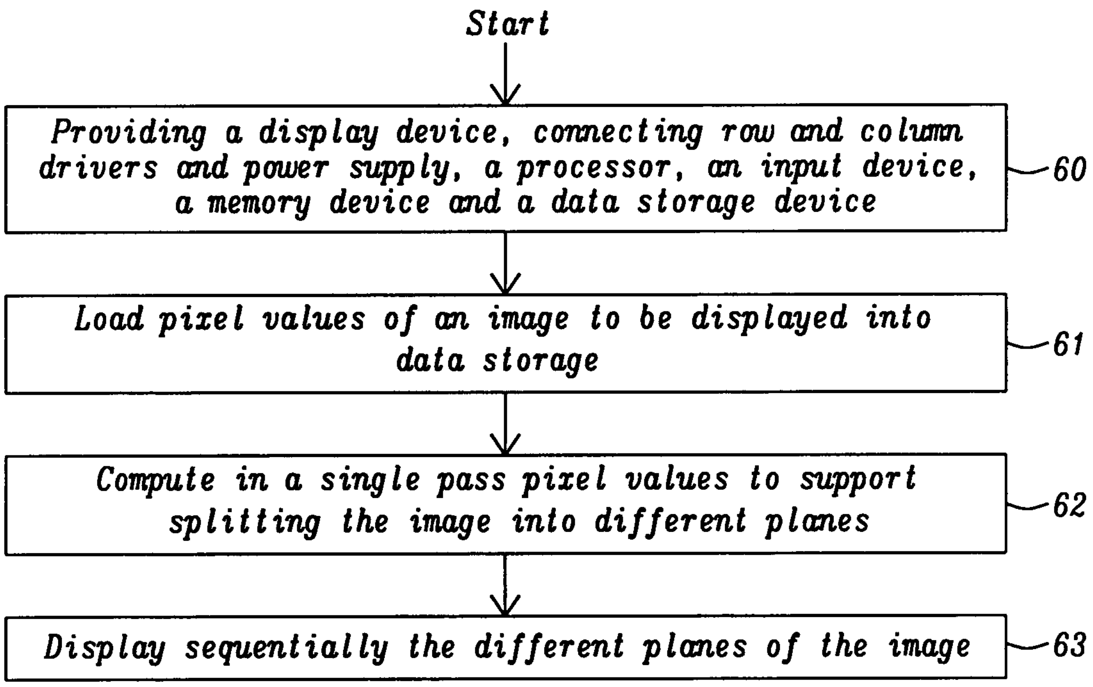
FIG. 6 illustrates a flowchart of a method invented to achieve an efficient display driver using a simple computation

FIG. 6 illustrates a flowchart of a method invented to achieve an efficient display driver using a simple computation with a minimal number of computation passes.

Step 60 of the method of FIG. 6 illustrates the provision of a display device, comprising row and column drivers and power supply, a processor, an input device, a memory device and a data storage device. Step 61 illustrates loading pixel values of an image to be displayed into the data storage. Step 62 describes computing in a single pass pixel values to support splitting the image into different planes. Step 63 illustrates displaying sequentially the different planes of the image.

Figure 7:
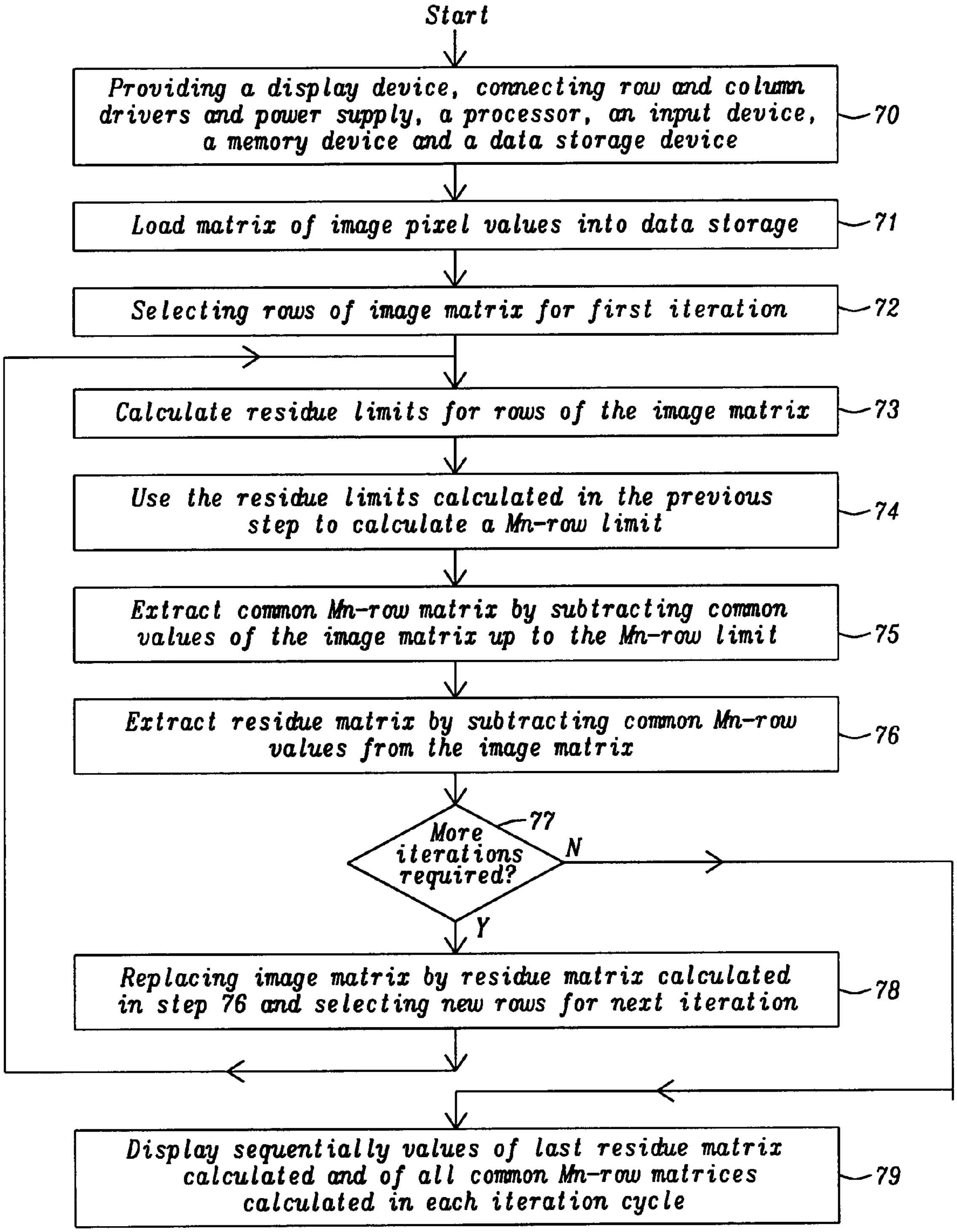
FIG. 7 illustrates in more detail a flowchart of a method invented to achieve an efficient display driver using a simple computation with a minimal number of passes.

FIG. 7 illustrates in more details a flowchart of a method invented to achieve an efficient display driver using a simple computation with a minimal number of passes.

Step 70 of the method of FIG. 7 illustrates the provision of a display device, comprising row and column drivers and power supply, a processor, an input device, a memory device, and a data storage device. Step 71 illustrates loading image pixel values into data storage. Step 72 describes selecting rows of the image matrix for the first iteration. Step 73 describes calculating residue limits for rows of the image matrix. Step 74 illustrates using the residue limits calculated in the previous step to calculate a Mn-row limit. Step 75 depicts extracting a common Mn-row matrix by subtracting common values of the image matrix up to the Mn-row limit. Step 76 illustrates extracting residue matrix by subtracting common Mn-row values from the image matrix. Step 77 is a check if more iterations are required and, if so, the process flow goes to step 78, otherwise the process flow goes to step 79. In step 78 the residue matrix calculated in step 75 replaces the image matrix, new rows are defined for the next iteration and the process flow goes to step 73. Step 79 illustrates displaying sequentially values of last residue matrix calculated and of all common Mn-row matrices calculated in each iteration cycle.

While the invention has been particularly shown and described with reference to the preferred embodiments thereof, it will be understood by those skilled in the art that various changes in form and details may be made without departing from the spirit and scope of the invention.

What is claimed is:

1. A method to achieve an efficient display driver using a simple computation with a minimal number of computation passes, comprising the following steps:

(1) providing a display device, comprising row and column drivers and power supply, a processor, an input device, a memory device, and a data storage device;

(2) loading pixel values of an image matrix, having rows and columns, to be displayed into the data storage, wherein the image can be decomposed into a number of tiles;

(3) computing in a single pass pixel values to support splitting the image into different planes, wherein each tile can be processed in parallel; and (4) displaying sequentially the different planes of the image.

2. The method of claim 1 wherein said display device is an organic light emitting diode (OLED).

3. The method of claim 1 wherein each tile can be processed in parallel and maximum numbers combined give true limits for residual and common planes.

4. The method of claim 1 wherein said computing in a single pass comprises the following steps:

(5) selecting rows of the image matrix for a first iteration;

(6) calculating residue limits for rows selected of the image matrix;

(7) using the residue limits calculated in the previous step to calculate a Mn-row limit;

(8) extracting a common Mn-row matrix by subtracting common values of the image matrix up to the Mn-row limit;

(9) extracting residue matrix by subtracting common Mn-row values from the image matrix;

(10) checking if more iterations are required and, if so, go to step 11, otherwise go to step 12;

(11) replacing image matrix by residue matrix calculated in step (9), selecting new rows for a next iteration, and go to step (6);

(12) displaying sequentially values of last residue matrix calculated and of all common Mn-row matrices calculated in each iteration cycle; and

(13) waiting for next image to be displayed.

5. The method of claim 4 wherein rows and columns are interchanged.

6. The method of claim 4 wherein the residue matrix is re-calculated on subsequent iterations.

7. The method of claim 4 wherein all rows of the image matrix are selected and even pairs of rows are selected for a same iteration provided the even pairs of rows are fully contained within the rows of that same iteration.

8. The method of claim 4 wherein all rows of the image matrix are selected and even pairs of rows are selected for a second iteration.

9. The method of claim 8 wherein odd pairs of rows are selected for a third iteration.

10. The method of claim 8 wherein results of the even pairs iteration can be used for an initial image display, and then image refresh periods can be used to include an odd pairs iteration to achieve the "full" results including a M2*b* matrix.

11. The method of claim 1 wherein a number of rows of image data retrieved from an image data buffer determines a maximum number of image planes that can be used.

12. The method of claim 1 wherein the row and column drivers are using timeslots to display the image sequentially.

13. The method of claim 1 wherein the column driver operates to determine the current magnitude/time period required to drive each column to the correct level, in dependence upon a number of parameters.

14. The method of claim 13 wherein the column driver reduces the time period for each column, in which case a higher current magnitude will be established.

15. The method of claim 13 wherein the column driver employs a fixed current source and so timeslot periods are adjusted in order to achieve the required drive level.

16. The method of claim 13 wherein the column driver provides equal timeslots in which case the current magnitude would then be adjusted for each column to achieve the required drive level.

17. The method of claim 13 wherein the column driver maximizes the data in one of the planes for power efficiency reasons and yet still minimize the time spent in the other planes.

18. The method of claim 13 wherein the column driver determines the current magnitude/time period required dependent on the contents of the image and types of images.

19. An apparatus for driving a matrix display panel in which a plurality of pixels are arranged in a matrix having respective pluralities of rows and columns, the apparatus comprising:

an image data buffer operable to retrieve image data relating to respective image drive values for a predetermined number of pixels, the predetermined number of pixels being arranged as a matrix having a first plurality of rows, and a second plurality of columns;

a calculation unit operable to:

calculate and store respective common row drive values for pixels in a given column, a common row drive value being equal to a lowest drive value for pixels in the column concerned;

calculate respective residual drive values for each pixel, a residual drive value for a pixel being equal to an image drive value for that pixel minus a common row value for the column in which the pixel is located; and to store residual drive values as the image data for the first plurality of rows;

a drive data buffer operable to store drive values; and drive circuitry operable to receive drive values from the drive data buffer, and to drive a matrix display panel in dependence upon received drive values, wherein the calculation unit is operable to repeat such calculation and storage operations for a predefined number of iterations.

20. The apparatus of claim 19 wherein said matrix display panel is an organic light emitting diode (OLED) panel.

21. The apparatus of claim 19 wherein the column driver operates to determine the current magnitude/time period required to drive each column to the correct level, in dependence upon a number of parameters.

22. The apparatus of claim 19 wherein the column driver reduces the time period for each column, in which case a higher current magnitude will be established.

23. The apparatus of claim 19 wherein the column driver employs a fixed current source and so timeslot periods are adjusted in order to achieve the required drive level.

24. The apparatus of claim 19 wherein the column driver provides equal timeslots in which case the current magnitude would then be adjusted for each column to achieve the required drive level.

25. The apparatus of claim 19 wherein the column driver maximizes the data in one of the planes for power efficiency reasons and yet still minimize the time spent in the other planes.

26. The apparatus of claim 19 wherein the column driver determines the current magnitude/time period required dependent on the contents of the image and types of images.

* * * * *